United States Patent
Jin et al.

(10) Patent No.: US 9,213,966 B2
(45) Date of Patent: Dec. 15, 2015

(54) REGULATION COMPLIANT DATA INTEGRATION FOR FINANCIAL INSTITUTIONS

(75) Inventors: Hui Jin, Sunnyvale, CA (US); Yogish Pai, Santa Clara, CA (US); Raju Venkata Satya Sanyasi Vusirikala, Bangalore (IN)

(73) Assignee: Intuit Inc., Mountain View, CA (US)

( * ) Notice: Subject to any disclaimer, the term of this patent is extended or adjusted under 35 U.S.C. 154(b) by 623 days.

(21) Appl. No.: 13/531,392

(22) Filed: Jun. 22, 2012

(65) Prior Publication Data

US 2013/0346320 A1 Dec. 26, 2013

(51) Int. Cl.
G06Q 20/00 (2012.01)
G06Q 20/10 (2012.01)
G06Q 40/02 (2012.01)

(52) U.S. Cl.
CPC ............... *G06Q 20/10* (2013.01); *G06Q 40/02* (2013.01)

(58) Field of Classification Search
USPC .......................................................... 705/76
See application file for complete search history.

(56) References Cited

U.S. PATENT DOCUMENTS

| | | | |
|---|---|---|---|
| 5,708,422 A * | 1/1998 | Blonder et al. | 340/5.41 |
| 5,892,900 A * | 4/1999 | Ginter et al. | 726/26 |
| 6,422,462 B1 * | 7/2002 | Cohen | 235/381 |
| 2002/0077837 A1 * | 6/2002 | Krueger et al. | 705/1 |
| 2004/0073688 A1 | 4/2004 | Sampson | |
| 2004/0159700 A1 * | 8/2004 | Khan et al. | 235/380 |
| 2004/0225603 A1 | 11/2004 | Allen et al. | |
| 2006/0026042 A1 | 2/2006 | Awaraji et al. | |
| 2007/0172063 A1 * | 7/2007 | Biggs et al. | 380/255 |
| 2011/0153512 A1 * | 6/2011 | Peckover | 705/318 |
| 2012/0005486 A1 | 1/2012 | Watanabe | |

FOREIGN PATENT DOCUMENTS

| | | |
|---|---|---|
| JP | 2006-501584 A | 1/2006 |
| JP | 2010-049553 A | 3/2010 |

OTHER PUBLICATIONS

International Search Report for PCT/US2012/043936 dated Feb. 28, 2013 (3 pages).
Written Opinion for PCT/US2012/043936 dated Feb. 28, 2013 (5 pages).
Patent Abstract for Japanese Publication No. 2010-049553, published on Mar. 4, 2010 (1 page).

* cited by examiner

*Primary Examiner* — Zeshan Qayyum
(74) *Attorney, Agent, or Firm* — Osha Liang LLP

(57) ABSTRACT

A method to access financial data. The method includes redirecting, by a computer processor and based on an input of a user, the user to a website of a financial institution (FI), wherein the user submits a request via the website to access the financial data, obtaining, in response to the user submitting the request, a token identifying the request, identifying, by the computer processor, a financial data structure in a remote repository based on the token, wherein the FI stores a financial data record in the financial data structure in response to the request, and retrieving, without user intervention, the financial data record from the financial data structure, wherein the financial data record is used by a financial management application to prepare a financial management report for the user.

20 Claims, 4 Drawing Sheets

REGULATION COMPLIANT DATA INTEGRATION FOR FINANCIAL INSTITUTIONS

BACKGROUND

Account aggregation refers to compiling information from different accounts, which may include bank accounts, credit card accounts, investment accounts, and other consumer or business accounts, into a single place. This may include a database or may be provided through "screen scraping" where a user provides the requisite account-access information for an automated system to gather and compile the information into a single page (e.g., webpage).

Financial institutions (FIs) often face legal obstacles to send financial data outside the country without explicit permission from local government authority. The approval process is usually long and unpredictable. The process often includes terms to allow third party auditors to conduct unannounced audits. Although account aggregation is not explicitly prohibited, FIs are often restricted from recommending such services to users. For example, the FIs are not allowed to partner with companies that request their users credentials (e.g., Internet banking User id/password). Further, many FIs' Risk/Compliance teams explicitly deny integration with any company if the data is hosted within U.S. to avoid the impact of the U.S. PATRIOT Act.

SUMMARY

In general, in one aspect, the invention relates to a method to access financial data. The method includes redirecting, by a computer processor and based on an input of a user, the user to a website of a financial institution (FI), wherein the user submits a request via the website to access the financial data, obtaining, in response to the user submitting the request, a token identifying the request, identifying, by the computer processor, a financial data structure in a remote repository based on the token, wherein the FI stores a financial data record in the financial data structure in response to the request, and retrieving, without user intervention, the financial data record from the financial data structure, wherein the financial data record is used by a financial management application to prepare a financial management report for the user.

In general, in one aspect, the invention relates to a system to access financial data. The system includes (i) a computer processor and memory, (ii) a financial data access module comprising instructions stored in the memory and executed by the computer processor to redirect, based on an input of a user, the user to a website of a financial institution (FI), wherein the user submits a request via the website to access the financial data, obtain, in response to the user submitting the request, a token identifying the request, identify a financial data structure in a remote repository based on the token, wherein the FI stores a financial data record in the financial data structure in response to the request, and retrieve the financial data record from the financial data structure without user intervention, wherein the financial data record is used by a financial management application to prepare a financial management report for the user, (iii) a local repository configured to store the financial data record retrieved by the financial data access module, and (iv) a remote repository configured to store the financial data structure by the FI.

In general, in one aspect, the invention relates to a non-transitory computer readable medium storing instructions to access financial data. The instructions, when executed by a computer processor, include functionality to redirect, based on an input of a user, the user to a website of a financial institution (FI), wherein the user submits a request via the website to access the financial data, obtain, in response to the user submitting the request, a token identifying the request, identify a financial data structure in a remote repository based on the token, wherein the FI stores a financial data record in the financial data structure in response to the request, and retrieve, without user intervention, the financial data record from the financial data structure, wherein the financial data record is used by a financial management application to prepare a financial management report for the user.

Other aspects of the invention will be apparent from the following detailed description and the appended claims.

DETAILED DESCRIPTION

Figure 1:
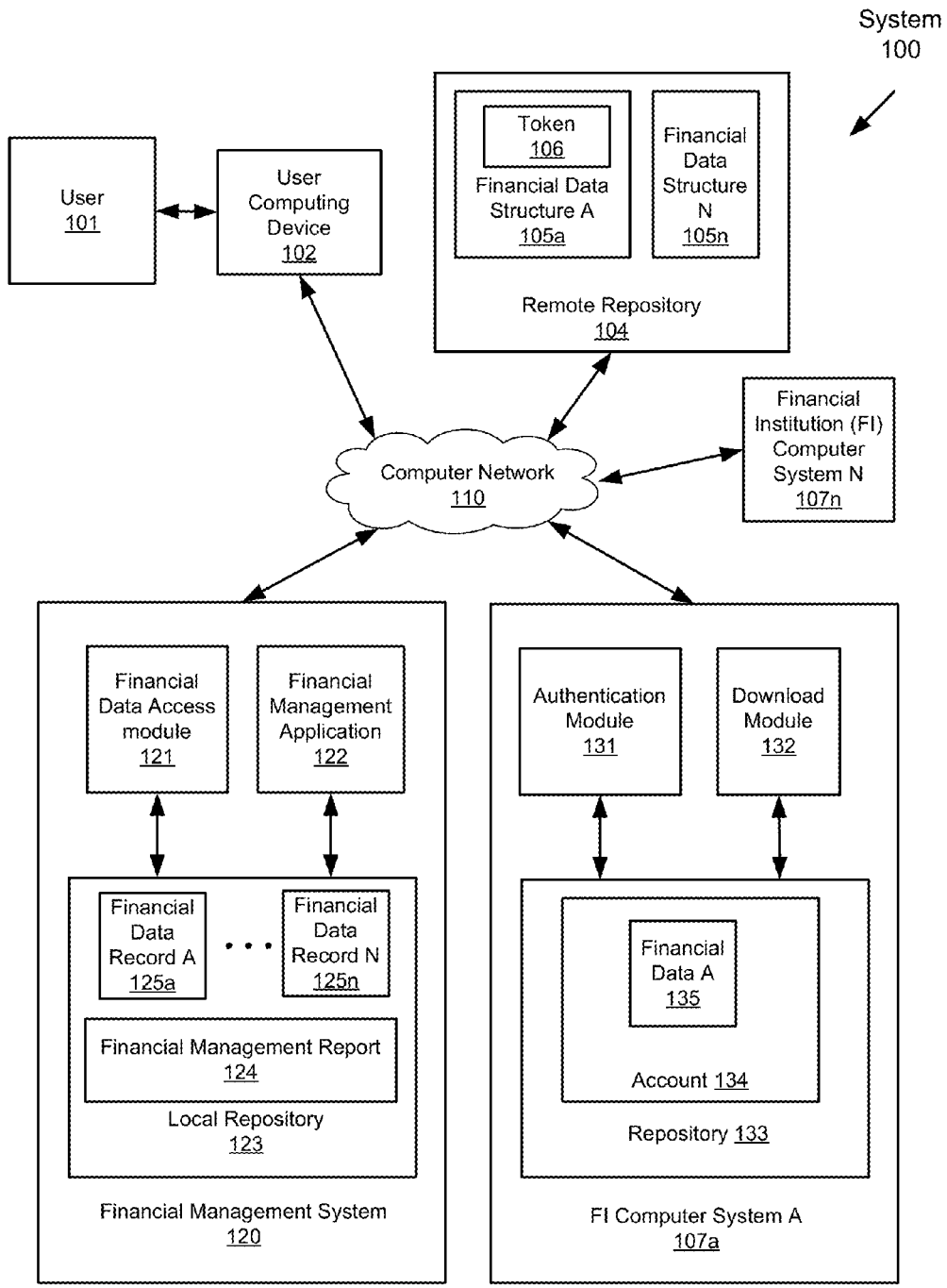
FIG. 1 shows a schematic diagram of a system of regulation compliant data integration for financial institutions in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a secure and regulation compliant solution to send financial data outside highly regulated countries. For example, FIs in highly regulated countries can support account aggregation functionality for their customers based on this secure and regulation compliant solution. In one or more embodiments, the FIs push out the financial data file on a periodic basis to a site hosted in their country and allow an account aggregation application to retrieve the file from an international location. Throughout this disclosure, the terms "account aggregation," "financial data aggregation," "data integration," and "financial data integration" may be used interchangeably depending on the context.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a user (101) using a user computing device (102) to access user financial information from one or more financial institution (FI) computer systems (e.g., FI computer system A (107a), FI computer system N (107n), etc.) and a financial management system (120). As shown, the user computing device (102), FI computer system A (107a), FI computer system N (107n), financial management system (120), and a remote repository (104) are coupled via computer network (110). For example, the remote repository (104) may be a disk drive storage device, semiconductor memory module, or other suitable non-volatile data storage device. Further, the computer network (110) may include a wireless communication network (e.g., a mobile phone network) and wired and/or wireless portions of the Internet and/or other data communications networks such as wide area networks (WANs), local area networks (LANs), etc. Details of various components of the system (100) are described below.

In one or more embodiments of the invention, the FI computer system A (107a) is operated by one of the FIs where the user (101) (e.g., an individual) may hold one or more financial accounts. For example, the account (134) belongs to the user (101) and is stored in the repository (133) of the FI computer system A (107a). In one or more embodiments, the FI computer system A (107a) includes an authentication module (131) and a download module (132) that are configured to provide the user (101) access to his/her financial information (e.g., financial data A (135)) managed using the account (134). Although not explicitly shown in FIG. 1, the FI computer system N (107n) may be operated by another FI and include similar modules as described above for the FI computer system A (107a). In particular, the user (101) may hold another financial account stored in the FI computer system N (107n) where the user (101) may access additional financial information similar to the financial data A (135) stored in the account (134). Throughout this disclosure, the terms "FI," "FI computer system," and "website hosted by the FI computer system" may be used interchangeably depending on the context.

In one or more embodiments of the invention, the financial management system (120) is operated by a third party account aggregation service that allows the user (101) to aggregate financial information (e.g., financial data A (135)) from multiple accounts held at multiple FIs (e.g., FI computer system A (107a), FI computer system N (107n). etc.). For example, the financial management report (124) may be compiled from financial data records (e.g., the financial data record A (125a), financial data record N (125n), etc.) that are replica of the financial information (e.g., financial data A (135)) of the user (101) from multiple accounts held at multiple FIs (e.g., FI computer system A (107a), FI computer system N (107n), etc.). In one or more embodiments, the financial data record A (125a), financial data record N (125n), etc. are replicated from the FI computer system A (107a), FI computer system N (107n), etc. in an indirect manner to satisfy regulatory requirements imposed within a geographical region where one or more of the FI computer system A (107a), FI computer system N (107n), etc. are located. Specifically, the regulatory requirements forbid FIs to export financial information of account holders crossing the border of the geographical region.

In one or more embodiments, the user financial information (e.g., financial data A (135)) are first retrieved from the FI computer system A (107a), FI computer system N (107n), etc. into the remote repository (104) before they are replicated into the financial data record A (125a), financial data record N (125n), etc. for storing in the local repository (123) of the financial management system (120). In particular, the remote repository (104) and the FI computer system A (107a), FI computer system N (107n), etc. are located within the same geographical region where regulatory requirements forbid FIs to export account holder financial information. Further, the financial data replication from the remote repository (104) to the local repository (123) is performed by the financial management system (120) that is not under the same restriction of the aforementioned regulatory requirements as the FIs. In one or more embodiments, the handing over of the financial information from the FIs to the financial management system (120) via the remote repository (104) is orchestrated using a tracking token as described below.

In one or more embodiments of the invention, the financial management system (120) includes a financial data access module (121) that is configured to redirect, based on a selection input of the user (101), the user (101) to a website hosted by the FI computer system A (107a), where the user (101) submits a request via the website to access the financial data A (135). For example, the user (101) may use the user computing device (102) to browse a bank aggregation website hosted by financial data access module (121) where the user (101) may select the FI to be included in the bank aggregation. By being redirected to the FI computer system A (107a), the user (101) submits user authentication credential to the FI without releasing the user authentication credential to the financial management system (120). In particular, the user authentication credential is authenticated by the authentication module (131) before the user (101) is allowed to access the financial data A (135). In one or more embodiments, upon redirecting the user (101) to the FI computer system A (107a) and in response to the user submitting the request to access the financial data A (135), the FI computer system A (107a) downloads the financial data A (135) in the remote repository (104). In one or more embodiments, the financial data A (135) is downloaded by the download module (132) and stored in a financial data structure A (105a) of the remote repository (104). In one or more embodiments, the financial data A (135) is stored in the financial data structure A (105a) along with a token (106) that is a tracking token generated to identify the redirection and the financial data access request. In one or more embodiments, the token (106) is generated when the user (101) is redirected to the FI computer system A (107a), which passes a reference or a copy of the token (106) to the financial data access module (121). In one or more embodiments, the tracking information contained in the token (106) is incrementally updated reflecting each subsequent financial data download. In one or more embodiments, the reference or the copy of the token (106) is passed by the FI computer system A (107a) directly to the financial data access module (121). In one or more embodiments, the reference or the copy of the token (106) is passed by the FI computer system A (107a) indirectly to the financial data access module (121) via a shared message passing mail box in the remote repository (104). For example, the token (106) may contain tracking information identifying the user (101), the user account, the geographic location where the account is held, the regulatory requirements associated with the geographic location where the account is held, the redirecting timestamp, the download timestamp, the reference pointers to various data records in the financial data structure A (105a), etc. Although not explicitly shown in FIG. 1, additional financial information of the user (101) may also be downloaded from the FI computer system N (107n) into a financial data structure N (105n) in the remote repository (104) in a similar manner. Accordingly, another tracking token is generated to track the downloaded financial information from the FI computer system N (107n) and another reference or copy of this tracking token is passed to the financial data access module (121). In one or more embodiments, multiple tokens (e.g., the token (106), etc.) generated in one bank aggregation session of the financial data access module (121) may be combined into a single super token for tracking multiple financial data downloads from multiple FIs (e.g., FI computer system A (107a), FI computer system N (107n)) into multiple financial data structures (e.g., financial data structure A (105a), financial data structure N (105n)) in the remote repository (104). For example, all downloaded financial data records tracked by this super token may later be compiled into a single aggregate report (e.g., the financial management report (124)) that includes user account information from multiple accounts held at these multiple FIs (e.g., FI computer system A (107a), FI computer system N (107n)).

In one or more embodiments, the financial data access module (121) is configured to identify the financial data structure A (105a) in the remote repository (104) based on the reference or the copy of the tracking token (106) obtained from the FI computer system A (107a), in order to replicate the downloaded financial data A (135) in the financial data structure A (105a) as the financial data record A (125a) in the local repository (123). Similarly, the financial data access module (121) is configured to identify the financial data structure N (105n) in the remote repository (104) based on the reference or the copy of the tracking token (e.g., the aforementioned super token) obtained from the FI computer system N (107n), in order to replicate the downloaded financial data in the financial data structure N (105n) as the financial data record N (125n) in the local repository (123). In one or more embodiments, the remote repository (104) is accessed by the financial data access module (121) automatically, i.e., without user intervention, to replicate financial information downloaded into the remote depository (104). For example, the remote repository (104) may be accessed by the financial data access module (121) based on a pre-determined wait time after the tracking token (e.g., token (106) or the aforementioned super token) is generated, based on a pre-determined recurring schedule, as triggered by a recurring event, etc.

In one or more embodiments of the invention, the financial management system (120) includes a financial management application (122) that is configured to generate the aggregate report (e.g., the financial management report (124)) that includes user account information from multiple accounts held at multiple FIs (e.g., FI computer system A (107a), FI computer system N (107n)).

Figure 2:
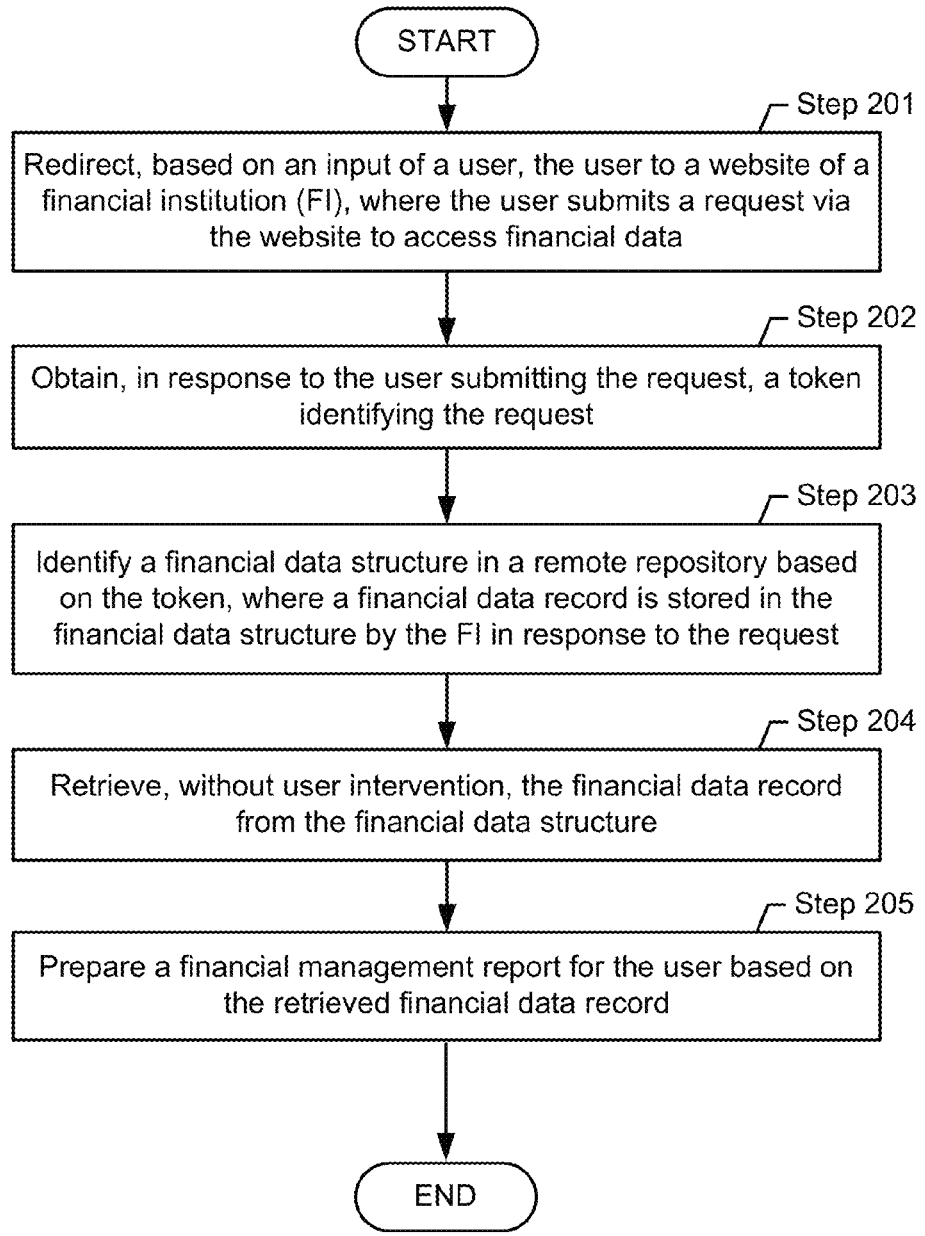
FIG. 2 shows a flowchart of a method of regulation compliant data integration for financial institutions in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Initially in Step 201, a user (more specifically, the browser of the user's computing device) is redirected, based on an input of a user, to a website of a financial institution (FI). In one or more embodiments, the user is initially browsing a user interface (UI) window (e.g., a web interface window) of a bank aggregation application while, based on a user selection in the UI window, the user is redirected to the FI website where the user submits a request via the website to access the financial data stored in a user account held at the FI. In one or more embodiments, the UI of the bank aggregation application allows the user to select multiple FIs to aggregate financial information stored in multiple accounts held at these multiple FIs. Each selection within the UI window redirects the user to the respective FI website where the user submits the financial data request by entering user authentication credential (e.g., user name and password), selecting one or more accounts, and specifying various other data selection options (e.g., start/date, statement period, etc.). In one or more embodiments, the user authentication credential is submitted directly to the FI website without releasing the user authentication credential to the computer processor executing the bank aggregation application.

In Step 202, in response to the user submitting the financial data request, a token identifying the request is obtained. In one or more embodiments, the token is obtained by the computer processor executing the bank aggregation application. In one or more embodiments, one token is generated for each FI website the user is redirected to. In one or more embodiments, multiple tokens identifying financial data requests to multiple FIs may be concatenated or otherwise combined into a super token for tracking all financial data requests related to a single bank aggregation request, i.e. a request to an aggregate report combining financial information stored in multiple accounts held at multiple FIs. For example, all these financial data requests may relate to the same monthly statement period or the same start/end time period. In one or more embodiments, the token contains tracking information identifying the user, the user account, the geographic location where the account is held, the regulatory requirements (i.e., restrictions or conditions for compliance) associated with the geographic location where the account is held, the FI redirecting timestamp, the financial data download timestamp, the reference pointers to various downloaded data records, etc.

In one or more embodiments, if the token identifies no applicable regulatory compliance requirements for a particular FI, the requested financial data is downloaded from the FI website directly into the bank aggregation application. For example, the computer server storing the user financial information for the FI as well as the server executing the bank aggregation application may be within the same geographic location (e.g., a highly regulated country) and therefore financial information sharing therebetween is not subject to the regulatory compliance rules. In another example, the computer server storing the user financial information for the FI may be located outside of the geographic location where the compliance requirements apply and therefore financial information sharing therefrom is not subject to the regulatory compliance rules.

In one or more embodiments, if the token identifies applicable regulatory compliance requirements for a particular FI, the requested financial data is downloaded from the FI website into the bank aggregation application indirectly via a remote repository. For example, the computer server storing the user financial information for the FI may be located inside the geographic location where the compliance requirements apply and therefore financial information exporting therefrom is subject to the regulatory compliance rules. In this scenario, downloading financial data from the FI website into the bank aggregation application indirectly via the remote repository is described in Steps 203 and 204 below.

In Step 203, in the scenario where the token identifies applicable regulatory compliance requirements for a particular FI, a financial data structure is identified in the aforementioned remote repository based on the token. In particular, a financial data record of the user is stored in the financial data structure by the FI in response to the financial data request. In this manner, the remote repository is used as a financial data passing mail box between the FI and the bank aggregation application. In one or more embodiments, the token is also passed between the FI and the bank aggregation application using the remote repository as a message passing mail box. In one or more embodiments, the remote repository is located in a geological location conforming to the regulatory compliance requirement governing the FI. For example, both the remote repository and the FI server are located within the border of the highly regulated country imposing the compliance requirement.

In Step 204, the financial data record of the user is retrieved, by the aforementioned computer processor (e.g., by the bank aggregation application executing on the computer processor) without user intervention, from the financial data structure in the remote repository. As noted above, financial data records from multiple FIs subject to the regulatory compliance requirements (as identified by the respective tokens) are retrieved indirectly from the FIs via the financial data structure(s) in the remote repository. Further, financial data records from other FIs not subject to the regulatory compliance requirements (as identified by the respective tokens) are retrieved directly from the FIs.

In Step 205, these financial data records are used by a financial management application to prepare a financial management report for the user. In particular, the financial management report includes financial information from multiple accounts of the user held at multiple FIs. For example, the financial management report may be a report summarizing transaction history of multiple accounts.

Figure 3:
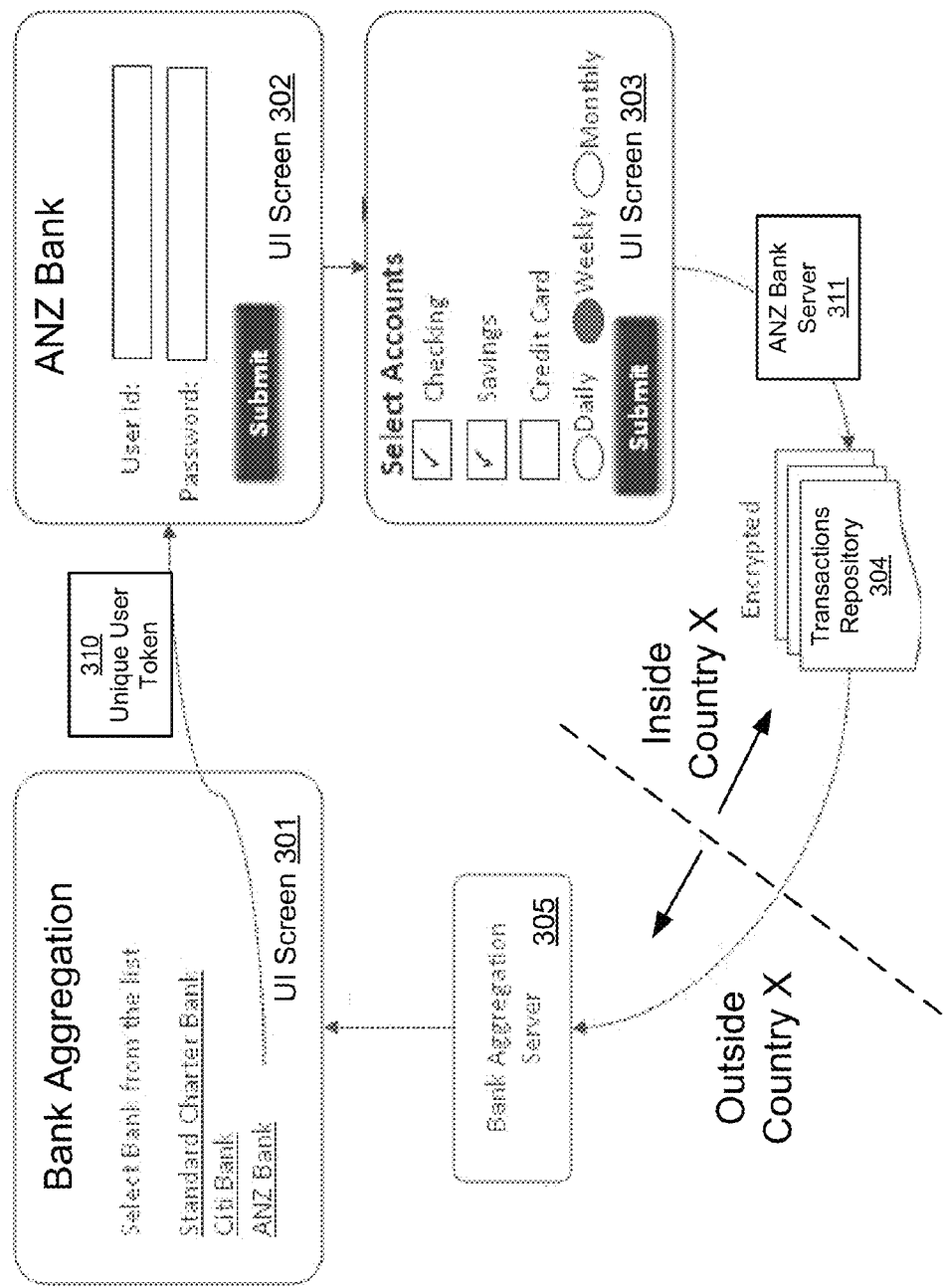
FIG. 3 shows an example of regulation compliant data integration for financial institutions in accordance with one or more embodiments of the invention.

FIG. 3 shows an application example in accordance with one or more embodiments of the invention. This example application may be practiced using the system (100) of FIG. 1 and based on the method described with respect to FIG. 2 above. In the example scenario described below, the bank aggregation server (305), the ANZ Bank, and the transactions repository (304) correspond to the financial management system (120), the FI computer system A (107a), and the remote repository (104) depicted in FIG. 1 above.

The example depicted in FIG. 3 is related to a scenario where a user of a financial institution "ANZ Bank" located within a highly regulated country X wishes to use an account aggregation solution "Bank Aggregation Application" operated by a third party entity located outside of the highly regulated country X. As shown in FIG. 3, the account aggregation solution "Bank Aggregation Application" executes on bank aggregation server (305) located outside of the highly regulated country X. In particular, the account aggregation solution "Bank Aggregation Application" presents a user interface (UI) screen (301) on a client device of the user that allows the user to select financial institutions for account aggregation. Specifically, the user may use the user interface screen (301) to select a financial institution "ANZ Bank" previously registered by the user under the user's account within the "Bank Aggregation Application." Once selected, the account aggregation solution "Bank Aggregation Application" redirects, with a unique user token (310), the user to an online banking website hosted by "ANZ Bank" where another UI screen (302) is presented on the client device to the user. Using the UI screen (302), the user enters access credentials (i.e., user ID and password) to access the user accounts held at the "ANZ Bank." For example using the UI screen (303), the user selects his checking account and savings account held at the "ANZ bank" and schedules automatic account data downloading on a weekly basis to the transactions repository (304). Specifically, the user's account data is maintained on and downloaded from an "ANZ Bank" server (311) located inside the highly regulated country X while the transactions repository (304) is also located within the same highly regulated country X. Because the data downloading performed using the "ANZ Bank" website does not transmit the user financial data across the physical border of the highly regulated country X, in particular not exported to U.S. territories, "ANZ Bank" is in full compliance with the regulatory requirements imposed by the highly regulated country X. Note that transactions repository (304) is not operated, or in any way controlled by the "ANZ Bank." Further, the user client device is only displaying the UI screens (301)-(303) without physically holding user financial data and may either be inside or outside the highly regulated country X.

As noted above, the user financial data is tagged with the unique user token (310) and together downloaded into the transactions repository (304). For example, the unique user token (310) contains tracking information identifying one or more of the user (101), the user account, the geographic location where the account is held, the regulatory requirements associated with the geographic location where the account is held, the redirecting timestamp, the download timestamp, the reference pointers to various data records in the financial data structure A (105a), etc. This tracking information allows the account aggregation solution "Bank Aggregation Application" executing on bank aggregation server (305) to retrieve, in a regulatory compliant manner, the downloaded user financial data from the transactions repository (304) on a periodic basis to prepare an aggregate financial report for the user. Because the third party operating the account aggregation solution "Bank Aggregation Application" and bank aggregation server (305) is not considered a financial institution and therefore the cross-border financial data retrieval is not restricted by the regulatory requirements imposed by the highly regulated country X. For example, the user may use the client device to retrieve the aggregate financial report from the bank aggregation server (305) for review without violating any applicable regulation.

Although not explicitly shown in FIG. 3, if the user selects Standard Charter Bank in the UI screen (301) for aggregation, the corresponding unique user token (310) may identify that there is no regulatory compliance requirements involved since Standard Charter Bank and its servers may be located outside the highly regulated country X. In this scenario, the user financial record stored in the account held by the Standard Charter Bank is directly downloaded into the bank aggregation server (305) bypassing the transactions repository (304).

Figure 4:
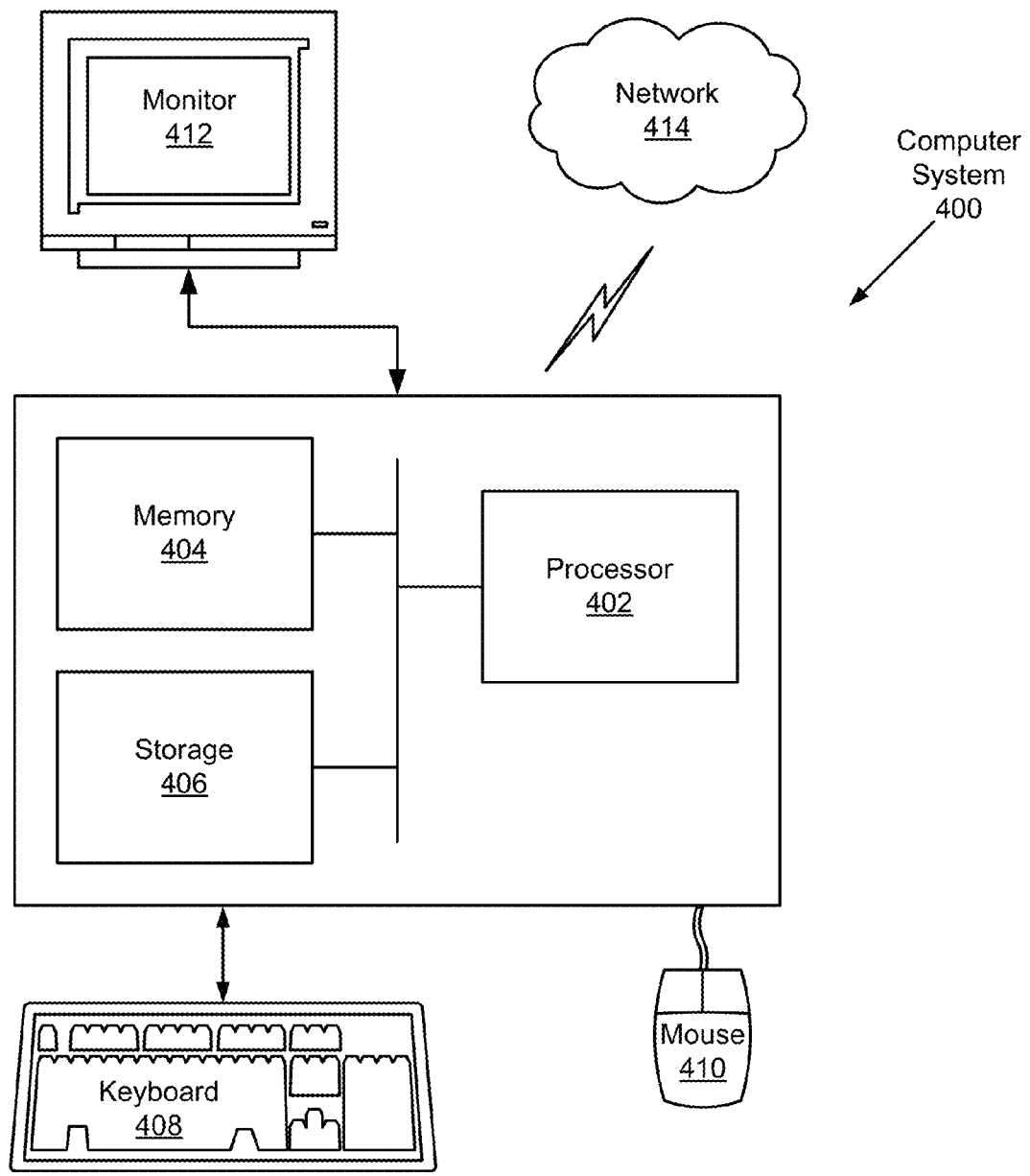
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (414). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to access financial data, comprising:
    redirecting, by a computer processor and based on an input of a user, the user to a website of a financial institution (FI);
    obtaining, by the computer processor and from the FI website, a token based on redirecting the user to the website of the FI, the token identifying a request to access the financial data via the website, wherein the token comprises information regarding a geographic location of the FI, a regulatory restriction on accessing the financial data from outside of the geographical location, and a reference pointer to a financial data structure in a remote repository;
    detecting, by the computer processor and based on the token, that the regulatory restriction applies to the request;
    identifying, by the computer processor and in response to detecting, the financial data structure in the remote repository based on the token, wherein the financial data structure comprises a financial data record downloaded from the FI in response to the request;
    retrieving, by the computer processor and without user intervention, the financial data record from the financial data structure; and
    preparing, by the computer processor, a financial management report based on the retrieved financial data record from the financial data structure.

2. The method of claim 1, wherein the remote repository is located in a geological location conforming to a regulatory compliance requirement governing the FI.

3. The method of claim 1,
    wherein the user submits a user authentication credential to the FI without releasing the user authentication credential to the computer processor.

4. The method of claim 1, wherein the token further comprises an account number of an account storing the financial data of the user.

5. The method of claim 1, wherein the financial data structure is created in response to a request from the FI to store the financial data record.

6. The method of claim 1, wherein the financial data structure comprises the token.

7. The method of claim 1, wherein the financial management report is based on a plurality of financial data records from a plurality of FIs.

8. A system to access financial data, comprising:
    a computer processor;
    a memory connected to the computer processor; and
    a plurality of instructions stored in the memory and, when executed by the computer processor, cause the computer processor to execute the steps of:
        redirecting, based on an input of a user, the user to a website of a financial institution (FI);
        obtaining, from the FI website, a token based on redirecting the user to the website of the FI, the token identifying a request to access the financial data via the website, wherein the token comprises information regarding a geographic location of the FI, a regulatory restriction on accessing the financial data from outside of the geographical location, and a reference pointer to a financial data structure in a remote repository;
        detecting, based on the token, that the regulatory restriction applies to the request;
        identifying, in response to detecting, the financial data structure in the remote repository based on the token, wherein the financial data structure comprises a financial data record downloaded from the FI in response to the request;
        retrieving the financial data record from the financial data structure without user intervention; and
        preparing a financial management report based on the retrieved financial data record from the financial data structure;
    a local repository external to the geographical location and configured to store the financial data record retrieved by the financial data access module; and
    a remote repository within the geographical location and configured to store the financial data structure by the FI.

9. The system of claim 8, wherein the remote repository is located in a geographical location conforming to a regulatory compliance requirement governing the FI.

10. The system of claim 8,
    wherein the user submits a user authentication credential to the FI without releasing the user authentication credential to the computer processor.

11. The system of claim 8, wherein the token further comprises an account number of an account storing the financial data of the user.

12. The system of claim 8, wherein the financial data structure is created in response to a request from the FI to store the financial data record.

13. The system of claim 12, wherein the financial data structure comprises the token.

14. The system of claim 8, wherein the financial management report is based on a plurality of financial data records from a plurality of FIs.

15. A non-transitory computer readable medium storing instructions to access financial data, the instructions, when executed by a computer processor, cause the computer processor to perform the steps of:
    redirecting, based on an input of a user, the user to a website of a financial institution (FI);
    obtaining, from the FI website, a token based on redirecting the user to the website of the FI, the token identifying a request submitted by the user to access the financial data via the website, wherein the token comprises information regarding a geographic location of the FI, a regulatory restriction on accessing the financial data from outside of the geographical location, and a reference pointer to a financial data structure in a remote repository;

detecting, based on the token, that the regulatory restriction applies to the request;

identifying, in response to detecting, the financial data structure in the remote repository based on the token, wherein the financial data structure comprises a financial data record downloaded from the FI in response to the request;

retrieving, without user intervention, the financial data record from the financial data structure; and preparing a financial management report based on the retrieved financial data record from the financial data structure, wherein the local repository is external to the geographical location, and wherein the remote repository is within the geographical location.

16. The non-transitory computer readable medium of claim 15,
wherein the user submits a user authentication credential to the FI without releasing the user authentication credential to the computer processor.

17. The non-transitory computer readable medium of claim 15, wherein the token further comprises an account number of an account storing the financial data of the user.

18. The non-transitory computer readable medium of claim 15, wherein the financial data structure is created in response to a request from the FI to store the financial data record.

19. The non-transitory computer readable medium of claim 15, wherein the financial data structure comprises the token.

20. The non-transitory computer readable medium of claim 15, wherein the financial management report is based on a plurality of financial data records from a plurality of FIs.

* * * * *